(12) United States Patent
Ju

(10) Patent No.: US 6,922,218 B2
(45) Date of Patent: Jul. 26, 2005

(54) METHOD FOR FABRICATING LIQUID CRYSTAL DISPLAY MONITOR WITH ESTHETIC BACK

(75) Inventor: Hung Chien Ju, Taoyuan (TW)

(73) Assignee: Hannstar Display Corporation, Taipei (TW)

( * ) Notice: Subject to any disclaimer, the term of this patent is extended or adjusted under 35 U.S.C. 154(b) by 444 days.

(21) Appl. No.: 09/997,356

(22) Filed: Nov. 27, 2001

(65) Prior Publication Data

US 2003/0011723 A1 Jan. 16, 2003

(30) Foreign Application Priority Data

Jul. 13, 2001 (TW) .......................................... 90117176 A
Aug. 6, 2001 (TW) .......................................... 90213278 U

(51) Int. Cl.$^7$ ............................................ G02F 1/1333
(52) U.S. Cl. ............................... 349/58; 349/59; 349/60
(58) Field of Search ......................... 349/58–60; 357/83

(56) References Cited

U.S. PATENT DOCUMENTS 6,104,451 A * 8/2000 Matsuoka et al. ............ 349/58
2002/0126236 A1 * 9/2002 Hiratsuka et al. ............ 349/58

* cited by examiner

Primary Examiner—Jerome Jackson
Assistant Examiner—Joseph Nguyen
(74) Attorney, Agent, or Firm—J.C. Patents

(57) ABSTRACT

An esthetic LCD monitor, including a liquid crystal display (LCD) panel having a first surface and a second surface against to the first surface, in which the first surface includes a displaying portion. A front housing covers the first surface of the LCD panel and expose the displaying portion. A back housing covers the second surface of the LCD panel. A base is engaged with the back housing in a butt hinge manner, such that the LCD panel with respect to the base in angle can be adjusted. A back cap has a about planar outer surface. The back cap is disposed on the back housing, where the back cap includes a metal material.

18 Claims, 4 Drawing Sheets

METHOD FOR FABRICATING LIQUID CRYSTAL DISPLAY MONITOR WITH ESTHETIC BACK

CROSS-REFERENCE TO RELATED APPLICATION

This application claims the priority benefit of Taiwan applications serial no. 90117176 and 90213278, filed Jul. 13, 2001 and Aug. 6, 2001.

BACKGROUND OF THE INVENTION

1. Field of Invention

The present invention relates to a liquid crystal display (LCD) panel. More particularly, the present invention relates to a liquid crystal display panel with an esthetic design by printing a pattern on back and the fabricating method.

2. Description of Related Art

The LCD monitor has been a usual device equipped with a personal computer due to its small volume, light, low power consumption, and non-irradiation. Like the various commercial products, the personal computer requires more convenient and more humanistic function but also requires that the space be small and weight be light and even the appearance be more beautiful and rich in diversity of pattern. Since the plastic material is easy to be formed into desired shape, very plastic, and light, the plastic material is commonly used to form a housing of appliances. For a LCD panel, the house is usually also made of plastic material.

Referring to FIG. 1 and FIG. 2, FIG. 1 is a front perspective view, illustrating a conventional LCD monitor. FIG. 2 is a back perspective view, illustrating the conventional LCD monitor in FIG. 1. The conventional LCD monitor 100 basically includes a LCD panel 102, such as the thin film transistor (TFT) LCD panel that currently is a main tendency. It has a front housing 104 and a back housing 106 to cover thereon. The front side of the LCD panel 102 has a displaying portion and the back side of the LCD panel has a portion of reflector or back light The front housing 104 does not only expose the displaying portion but also include multiple buttons 108, so as to adjust the parameters, such as brightness and contrast. A voice hole (not shown) may even be included to allow the output of voice. The back housing 106 includes multiple thermal dissipation holes 112, which can have the slit structure or circular holes. Usually, the front housing 104 and the back housing 106 include plastic material. Under the consideration of thermal dissipation, the back housing 106 has dissipation holes 112 and also needs to contain a part of wires. Thus, its shape is not regular and it is not easy to make the pattern by printing. As a result, the appearance cannot be beautified. The front housing 104, the back housing 106 and the LCD panel 102 are installed on a base 110. However, even though the plastic product can be easily fabricated, it is very difficult and complicated to beautify the housing by forming an esthetic pattern on its surface due to the appearance is not regular. In addition, the plastic housing cannot provide any protection of electromagnetic interference and would also affect the quality of the LCD monitor.

If a pattern is desired to be printed on a curving or concave surface of the plastic product, the conventional manner has to take processes of shifting printing, thermal transferring printing, or gluing a cover film. These manners have common disadvantages that the yield is low, fabrication process is complicated crinkle easily occurs, the printing net is not easy to be steadily located, and overdyeing is also difficult. It is quite difficult to apply the manners to the product needing a complicated color effect or pattern. For the commonly accepted product of LCD monitor, consumers always desire to have a specific pattern with colorful design. However, for this kind of need, the product currently has not been declared in the market. It is also in short for the corresponding fabricating process to solve the issues. In other words, the fabrication processes have to face the problems of high fabrication cost, low yield, limitation of color and style.

SUMMARY OF THE INVENTION

An objective of the invention is to provide an esthetic LCD monitor with a back cap on the backside of the LCD monitor, and allowing its surface to be designed with desired patterns. As a result, the appearance of the LCD monitor can be rich in design variety, so as to satisfy the designing trend in the future with a personal style.

Another objective of the invention is to provide an esthetic LCD monitor with metal back cap, so as to shield the electromagnetic interference, and also effectively maintain the thermal dissipation effect.

Further another objective of the invention is to provide a printing method on a sheeting element, which can be used on fabrication of a back cap of LCD monitor or a housing of personal computer. The sheeting element can be printed with various colorful patterns.

To at least achieve the foregoing objective, the invention provides an esthetic LCD monitor, including a liquid crystal display (LCD) panel having a. first surface and a second surface again to the first surface, in which the first surface includes a displaying portion. A front housing covers the first surface of the LCD panel and expose the displaying portion. A back housing covers the second surface of the LCD panel. A base is engaged with the back housing by, for example, a butt hinge, such that the angle of the LCD panel with respect to the base can be adjusted. A back cap has a generally planar outer surface. The back cap is disposed on the back housing, where the back cap includes a metallic material.

The back cap includes a plate body and a sidewall. The plate body has an outer appearance about conformal to the LCD panel and the about planar outer surface. The plate body includes metallic material. The sidewall abuts the rim of the plate body and is about perpendicular to the plate body, and is further suitable for use in connecting with an outer rim of the LCD monitor.

According to the preferred embodiment of the invention, the plate body and the sidewall are integrated in one body. The sidewall and the corresponding outer rim of the LCD monitor are respectively formed with a buckle connection structure. The plat body and/or the sidewall further includes at least one screw hole, suitable for affixing the back cap to the LCD monitor by a screw. The back cap includes aluminum, aluminum alloy, or magnesium alloy.

An outer surface of the back cap has a pattern. The pattern is formed by a surface printing method. The pattern can also be formed by an etching process to pattern the surface or a sand jet process to pattern the surface. The back cap of the LCD monitor of the invention can further include a plastic transparent cover, enclosing the outer surface of the back cap.

To at least achieve the foregoing objective, the invention provides a printing method on a sheeting element, which method can be applied to a screen back cap, an electric appliance housing, metal packaging housing, and housing for anti-radiation of electric appliance. The printing method on a sheeting plate includes providing a metal plate. A surface printing process is performed to form a pattern on the surface of the metal plate. Then, a protection film is adhered on the surface of the pattern of the metal plate. A drawing process is performed to draw the metal plate into a desired housing shape as a sheeting element.

According to a preferred embodiment of the invention, before the step of surface printing process, the invention further includes a surface film treatment. The surface film treatment includes performing sand jet treatment or etching treatment. Moreover, the metal plate includes aluminum, aluminum alloy, or aluminum-magnesium alloy. The protection film includes polyurethane (PU). The pattern with various colors can be achieved by performing a few steps of the plate printing process with respect to different colors.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
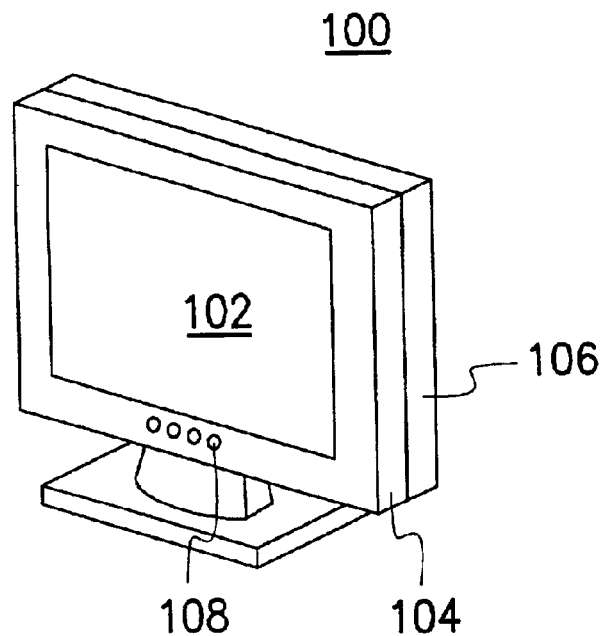
FIG. 1 is a front perspective view, illustrating a conventional LCD monitor.
Figure 2:
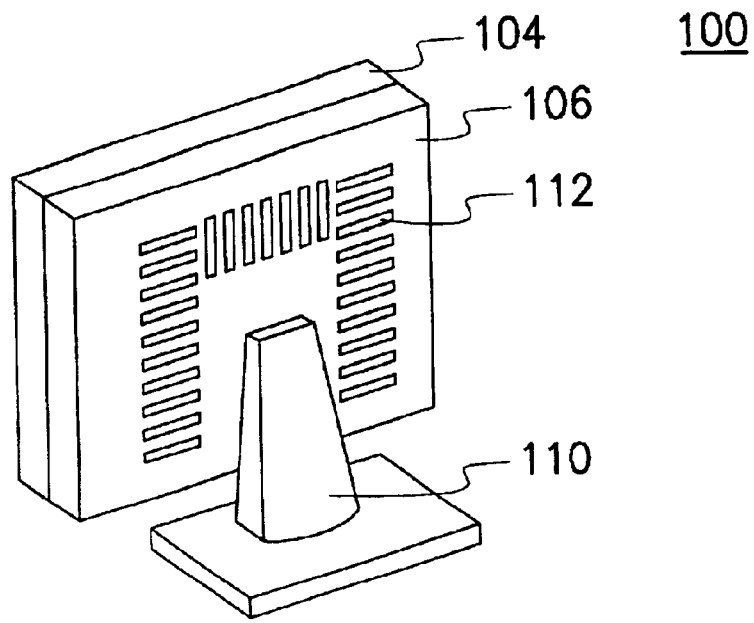
FIG. 2 is a back perspective view, illustrating a conventional LCD monitor in FIG. 1.
Figure 3:
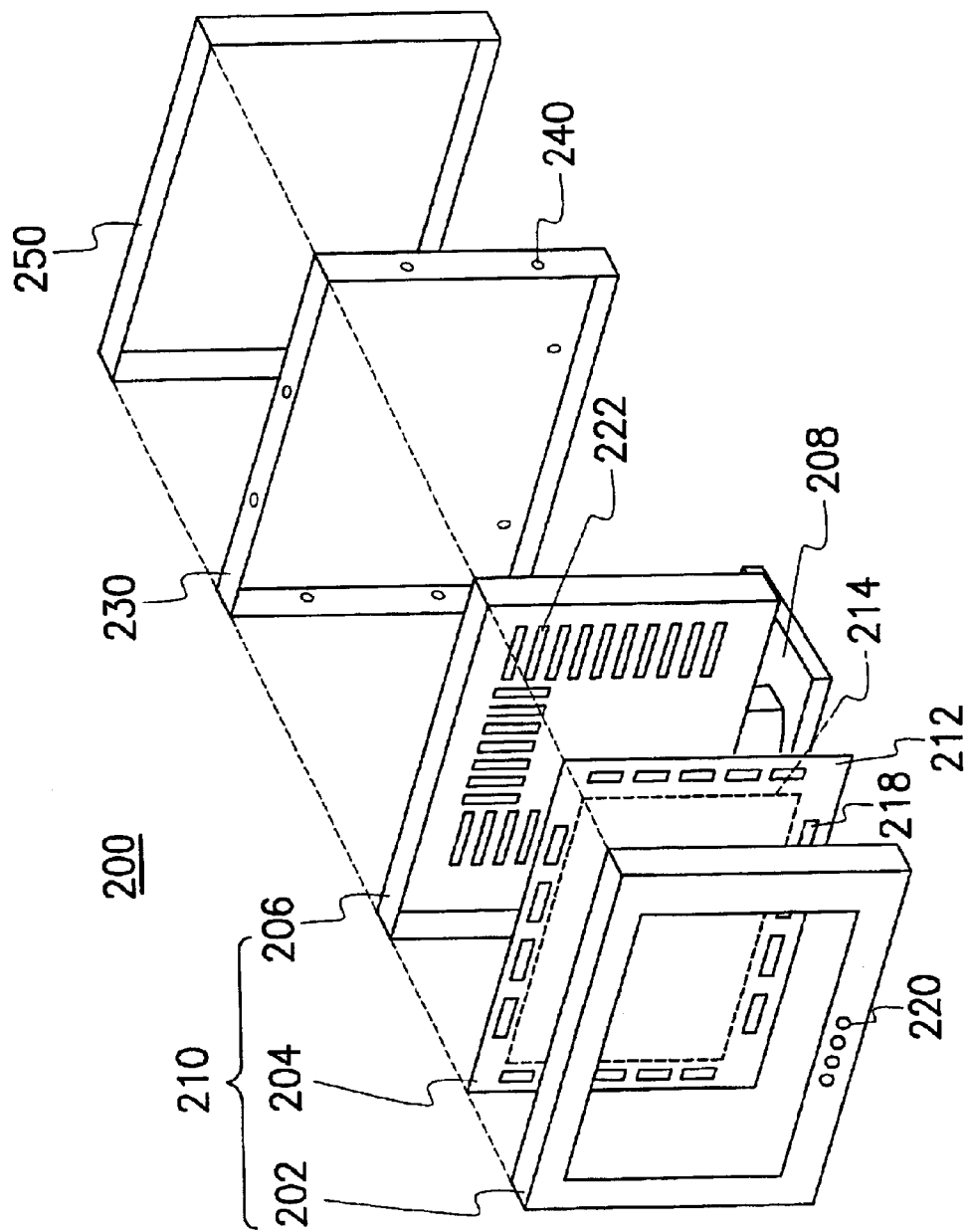
FIG. 3 is an explosive drawing in perspective view, schematically illustrating an LCD monitor with esthetic back design, according to one preferred embodiment of this invention.
Figure 4:
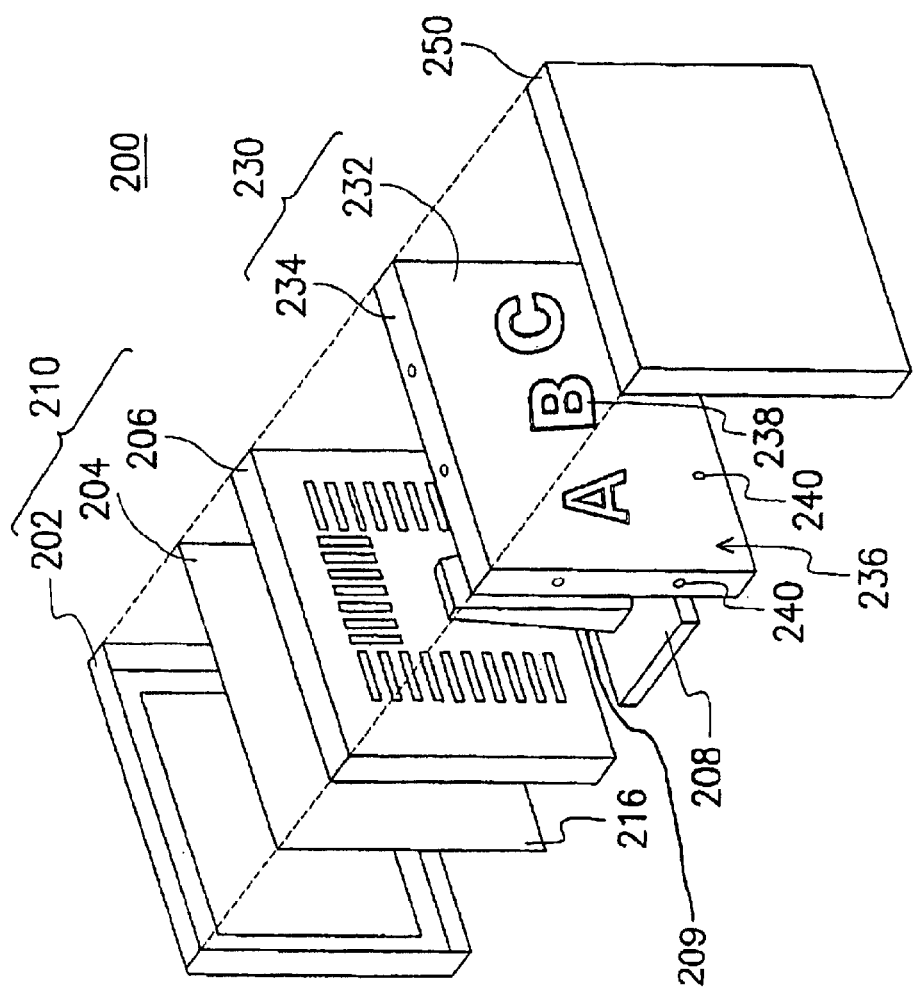
FIG. 4 is a back perspective view for the LCD monitor in FIG. 3, according to one preferred embodiment of this invention.

Referring to FIG. 3 and FIG. 4, FIG. 3 is an explosive drawing in perspective view, schematically illustrating an LCD monitor with esthetic back design, according to one preferred embodiment of this invention. FIG. 4 is a back perspective view for the LCD monitor in FIG. 3. The LCD monitor 200 include a screen body 210 and-a base 208. The screen body 210 includes a front housing 202, an LCD panel 204, and a back housing 206. The base 208 is engaged to the base by, a butt hinge 209 to form a holding part. The LCD panel 204 includes, for example, a thin film transistor (TFT) LCD panel. The front side 212, which is the first surface, has a displaying portion 214. The driver device 218 is located at the peripheral region of the-displaying portion 214. The back side 216, which is the second surface, has a portion for installing back light and reflector. The front housing 202 encloses the front side 212 of the LCD panel 204 but exposes the displaying portion 214. The front housing 202 also includes multiple adjusting button 220, used to adjust the screen setting parameters, such as brightness or contrast, or also installed with voice hole (not shown), used for exporting voice. The back housing 206 encloses the back side 216 of the LCD panel 204 and includes multiple thermal dissipation holes 222 like a slit hole, as shown in FIG. 3 or circular holes. The base 208 is engaged to the back housing 216 by, for example, a hinge or a multi-direction connector. This arrangement allows the adjustment of the screen body 210 with respect to the base 208. The foregoing front housing 202, back housing 206 and base 208 usually are made of plastic material.

The esthetic LCD monitor of the invention includes a back cap 230, which includes a plate body 232 and a sidewall 234, covers on the back housing 206. The shape of the plate body 232 is designed according to the appearance of the screen body 210 conformal to the screen body 210. The outer surface of the plate body 232 is generally planar, and forms the esthetic back, such as a printed color pattern 238. The plate body 232 and the sidewall 234 can be formed by a metal with an integrated one body. It can also provide a good protection against electromagnetic interference. The back 230 is affixed to the screen body 210 by an affixing device. For example, screw holes 240 can be formed on the plate body 232 and/or the sidewall 234. The back cap 230 is then affixed on the screen body by screws. Alternatively, the inner side of the sidewall 234 can be formed with a protruding part, and the rim of the back housing 206 can be formed with a concave part, whereby a buckle mechanism is achieved. Moreover, the protrusion structure can also be formed on the rim of the back housing 206 and the concave part is formed on the inner side of the sidewall 234, whereby the purpose of the buckle mechanism is achieved. In addition to the affixing device, the skilled artisans should known that it still has many other affixing method, such as using rivets or bonding. The affixing method is not limited to the foregoing methods.

Further still, the back cap 230 can be additionally covered with transparent protection cover 250, which can protect the pattern 238 on the back cap 230 from being scratched. Some other manners of semi-transparent or partial transparent portion can be applied to improve the esthetic view for the back pattern of the LCD monitor. The transparent protection cover 250 includes, for example, plastic material, which can be formed by drawing process.

Figure 5:
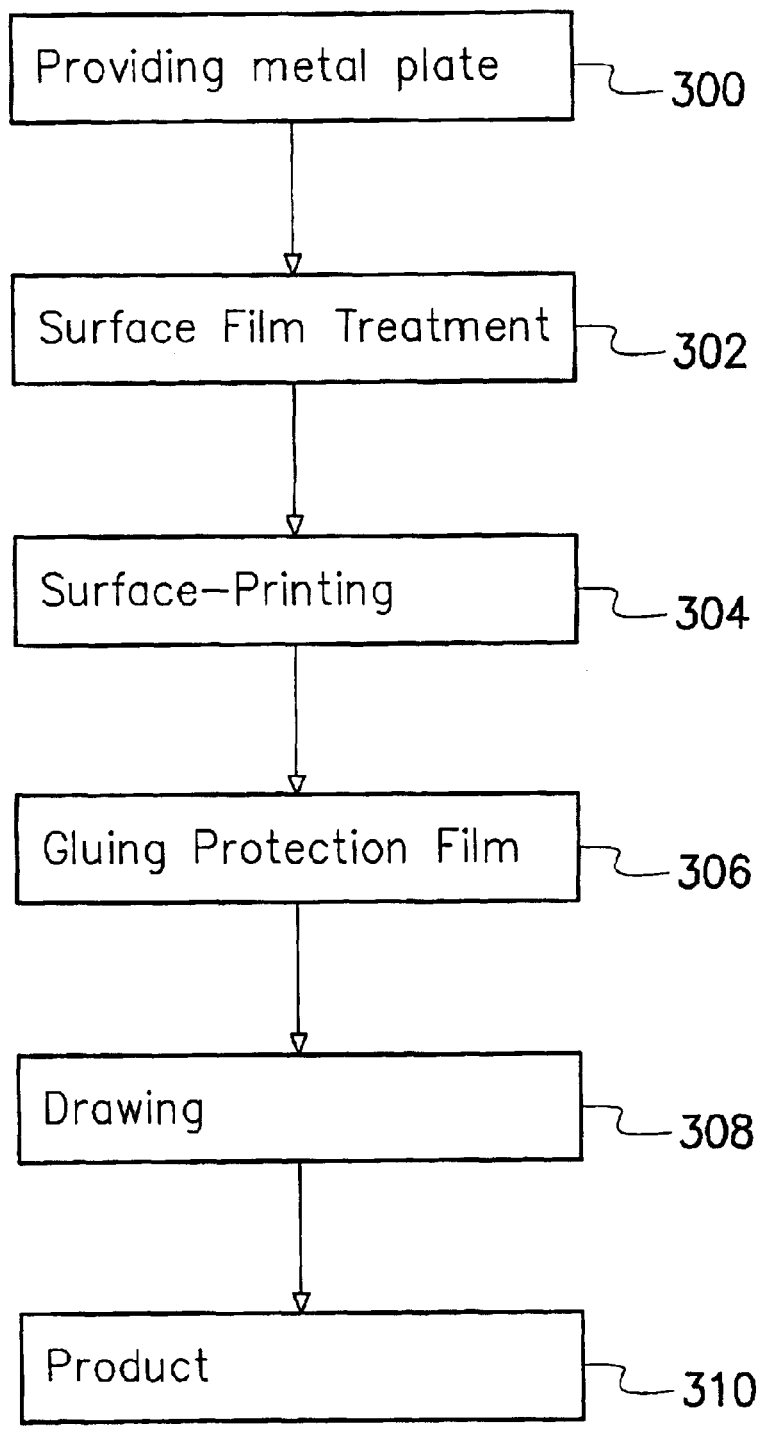
FIG. 5 is a process diagram, schematically illustrating the fabrication process to form a back cap for the LCD monitor, according to one preferred embodiment of this invention.

However, to achieve the foregoing design for the esthetic back, the invention introduces a fabrication method for forming a back cap of the LCD monitor. FIG. 5 is a process diagram, schematically illustrating the fabrication process to form a back cap for the LCD monitor. In FIG. 5, the back cap of the LCD monitor is formed by a metal plate with work. In step 300, a metal plate is provided to serve as a substrate. The metal plate can include, for example, aluminum, aluminum alloy, or other metallic material. In step 302, a surface film treatment is optionally performed. That is, a surface work as needed is performed on the surface of the metal plate desired to have the printed pattern, such as etching or sand jet treatment to obtain the more 3-dimensional view and more diversity for the pattern in the subsequent process. Alternatively, the surface film treatment can be optionally performed according to the actual design and need. The surface film treatment can even be omitted. Instead, a printing process is performed in the subsequent process on the clean surface of the metal plate.

Then, in step 304, a surface printing process is performed on the metal plate. Since the surface of the metal plate is about planar in the current step, it is very suitable for performing the surface printing to directly print the patterns on the surface of the metal plate. If the color pattern is chosen, it can be achieved by performing multiple surface printing processes. For example, it can takes red, blue, yellow surface printings. After the color overdyeing, various color patterns can be obtained. Usually, the desired pattern is de-coupled in color into several basic colors, such as three or five, or even more, according to the actual color variation. The surface printing for each color is then performed and then the overdyeing printing is performed. As a result, a colorful pattern is achieved. Since the overdyeing in surface printing technique can be precisely controlled, the yield can be quite high. In addition, the formation of plate and the printing speed are fast, the cost is small. It is quite suitable for massive production. Moreover, due to the color separation, formation of plate, overdyeing all takes only a short time, it is also quite suitable for a small production but with variety.

Furthermore, in step 306, a protection film can be optionally glued on the metal surface, on which a colorful pattern has be formed. The protection film includes, for example, polyurethane (PU) or other organic films. The purpose of the protection film is to protect the already printed pattern from being damaged in the subsequent process. Of course, the step 306 can associate with the surface printing results and the mold designs to decide whether or not the protection film is needed. Therefore, the step for adhering the protection film can be skipped. After then, in step 308, a drawing process for formation is performed. The metal plate is drawn in formation to have the desired shape for the back cap of the LCD monitor. In step 310, the final product is achieved. The drawing forming process can include one or more molds to perform drawing processes, according to the complexity of the LCD monitor. In addition, several needed assembling holes can also be formed, such as the screw holes. Moreover, in the step of surface plating process, the aligning marks used by the overdyeing operation cam also be used as the alignment point in the drawing forming process. This can assure the production yield to be high.

Even though the foregoing example uses the back cap of the LCD monitor as an example, the skilled artisans should know that the technique can be applied to any plate element, which can include aluminum, aluminum alloy, aluminum magnesium alloy, and so on. The application scope can be generally applied to the back cap of LCD monitor, housing of electric appliance, housing of personal computer, electric packaging box, or house for shielding electromagnetic interference (EMI). The method of the invention can be applied to related products with appearance design in more variety.

In summary, the invention at least includes the advantages as follows:

1. The LCD monitor with esthetic back additionally includes the back cap, which can be formed with various patterns on the surface by the surface printing associating with drawing formation. As a result, the LCD monitor can have various designs, so as to satisfy the trend for the personalized design in the future.

2. The LCD monitor with esthetic back additionally includes a metal back cap, which can provide the better protection of the electromagnetic interference, also and improve the practical and esthetic effect. Due to the good thermal conductivity for the metal material, and low thermal yield from the LCD monitor, the thermal dissipation can remain at a proper condition.

3. According to the fabrication method of the invention, the surface printing process can be performed before the sheeting plate is formed, whereby it improve the work ability for printing the pattern on the sheeting plate. At the same time, the invention also takes the surface printing, which can improve the production yield, reduce the fabrication cost, and be fabricated by massive production.

4. According to the fabrication method of the invention, after the pattern is printed on the metal plate, the protection film is adhered before performing drawing process. This manner can assure the pattern not to be damaged and can be applied to various appearance of the sheeting plate.

5. The invention with respect to various houses in different appliance provides a various choice of design in fabrication techniques. This can satisfy the trend of need of personal design in the future.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A liquid crystal display (LCD) monitor with esthetic back, comprising:
   an LCD panel, having a first surface and a second surface against the first surface, wherein the first surface has a displaying portion and the second surface has a portion for installing back light and reflector;
   a front housing, covering the first surface of the LCD panel and exposing the displaying portion;
   a back housing, covering the second surface of the LCD panel;
   a base, engaged with the back housing by a butt hinge, such that an angle of the LCD panel can be adjusted with respect to the base; and
   a back cap, having a generally planar outer surface, the back cap covering the back housing, wherein the back cap includes a metallic material and the back housing is located between the back cap and the LCD panel.

2. The LCD monitor of claim 1, the back cap is affixed onto the back housing.

3. The LCD monitor of claim 2, further comprising a screw hole for a screw on said sidewall of the back cap and a corresponding screw hole on a surface of the back housing, wherein the back cap is affixed onto the back housing by engaging screws into the first screw holes and the second screw holes.

4. The LCD monitor of claim 1, wherein the back cap includes one material selected from the group consisting of aluminum, aluminum alloy, and aluminum/magnesium alloy.

5. The LCD monitor of claim 1, wherein the outer surface of the back cap comprises a pattern, which is a surface printed pattern.

6. The LCD monitor of claim 1, wherein the outer surface of the back cap is a patterned surface resulting from etched treatment.

7. The LCD monitor of claim 1, wherein the outer surface of the back cap is a patterned surface resulting from sand jet treatment.

8. The LCD monitor of claim 1, further comprising a protection film, covering the outer surface of the back cap.

9. The LCD monitor of claim 8, wherein the protection film includes plastic material.

10. A back cap of liquid crystal display (LCD) screen, suitable for use in an LCD monitor, the LCD monitor comprising a screen body having a front housing, an LCD panel and a back housing, and holding part coupled with the screen body, wherein the housing covers a back surface of the LCD panel and the back cap covers the back housing and partially covers the holding part, the back cap of LCD screen comprising:

a plate body, having a shape conformal to an appearance of the screen body, the plate body having an outer surface being planar which is viewable from outside, wherein the plate body includes a metallic material; and a sidewall, connecting to the plate body at a rim, and being perpendicular to the plate body, wherein the sidewall can be connected to an outer periphery of the screen body.

11. The back cap of LCD screen of claim 10, wherein the plate body and the sidewall are an integrated body.

12. The back cap of LCD screen of claim 10, further comprising a first screw holes on said sidewall on a rim of the back cap and corresponding second screw holes on surface of the back housing, wherein the back cap is affixed on the back housing by engaging screws into the first screw holes and the second screw holes.

13. The back cap of LCD screen of claim 10, wherein the plate body includes one material selected from the group consisting of aluminum, aluminum alloy, and aluminum/magnesium alloy.

14. The back cap of LCD screen of claim 10, wherein the outer surface of the back cap comprises a pattern, which is a surface printed pattern.

15. The back cap of LCD screen of claim 10, wherein the outer surface of the back cap is a patterned surface resulting from etched treatment.

16. The back cap of LCD screen of claim 10, wherein the outer surface of the back cap is a patterned surface resulting from sand jet treatment.

17. The back cap of LCD screen of claim 10, further comprising a protection film, covering the outer surface of the back cap.

18. The back cap of LCD screen of claim 17, wherein the protection film includes plastic material.

* * * * *